United States Patent
Tucker et al.

(10) Patent No.: US 10,612,395 B2
(45) Date of Patent: Apr. 7, 2020

(54) DUAL WALLED COMPONENT FOR A GAS TURBINE ENGINE

(71) Applicant: ROLLS-ROYCE PLC, London (GB)

(72) Inventors: Matthew D Tucker, Bristol (GB); Simon L Jones, Bristol (GB)

(73) Assignee: ROLLS-ROYCE PLC, London (GB)

( * ) Notice: Subject to any disclaimer, the term of this patent is extended or adjusted under 35 U.S.C. 154(b) by 164 days.

(21) Appl. No.: 15/680,876

(22) Filed: Aug. 18, 2017

(65) Prior Publication Data
US 2018/0058226 A1    Mar. 1, 2018

(30) Foreign Application Priority Data

Aug. 24, 2016 (GB) ................................ 1614428.9

(51) Int. Cl.
*F01D 5/18* (2006.01)
*F01D 9/06* (2006.01)
(Continued)

(52) U.S. Cl.
CPC ............ *F01D 5/187* (2013.01); *B22F 3/1055* (2013.01); *B22F 5/04* (2013.01); *B33Y 10/00* (2014.12); *B33Y 80/00* (2014.12); *F01D 9/041* (2013.01); *F01D 9/065* (2013.01); *F01D 25/12* (2013.01); *F05D 2220/32* (2013.01); *F05D 2230/10* (2013.01); *F05D 2230/21* (2013.01); *F05D 2230/22* (2013.01); *F05D 2230/30* (2013.01); *F05D 2240/12* (2013.01); *F05D 2240/30* (2013.01); *F05D 2250/12* (2013.01); *F05D 2250/121* (2013.01); *F05D 2250/13* (2013.01); *F05D 2250/131* (2013.01); *F05D 2250/132* (2013.01); *F05D 2260/202* (2013.01); *F05D 2260/204* (2013.01); *F05D 2260/2212* (2013.01)

(58) Field of Classification Search
CPC .......... F01D 5/187; F01D 5/188; F01D 5/189; F01D 5/181; F01D 5/184; F01D 5/186
USPC ........................................................ 416/97 R
See application file for complete search history.

(56) References Cited

U.S. PATENT DOCUMENTS

| 6,122,892 A | 9/2000 | Gonidec et al. |
| 7,857,588 B2 * | 12/2010 | Propheter-Hinckley ..................... F01D 5/147 416/233 |

(Continued)

FOREIGN PATENT DOCUMENTS

| EP | 2011970 A2 | 1/2009 |
| GB | 2443830 A  | 5/2008 |

OTHER PUBLICATIONS

Feb. 19, 2018 Combined Search and Examination Report issued in Patent Application No. GB1713259.8.

(Continued)

*Primary Examiner* — Ninh H. Nguyen
*Assistant Examiner* — Jason Mikus
(74) *Attorney, Agent, or Firm* — Oliff PLC (57) ABSTRACT

An air cooled component for a gas turbine engine including a first wall and a second wall having opposing inner surfaces to define a gap therebetween, and a lattice of intersecting elongate ribs extending longitudinally along the first and second walls and transversely between the inner surfaces of the first and second walls to provide a plurality of cells. One or more portions of the ribs include an aperture to provide a flow path between adjacent cells so that the cells are in fluid communication.

18 Claims, 6 Drawing Sheets

(51) Int. Cl.
*B22F 3/105* (2006.01)
*B33Y 80/00* (2015.01)
*B22F 5/04* (2006.01)
*B33Y 10/00* (2015.01)
*F01D 9/04* (2006.01)
*F01D 25/12* (2006.01)

(56) References Cited

U.S. PATENT DOCUMENTS

| | | | |
|---|---|---|---|
| 8,057,183 B1 | 11/2011 | Liang | |
| 8,220,273 B2* | 7/2012 | Iwasaki | F23R 3/005 |
| | | | 60/752 |
| 2013/0280059 A1* | 10/2013 | Dolansky | F01D 5/147 |
| | | | 415/208.1 |
| 2017/0030202 A1* | 2/2017 | Itzel | F01D 5/188 |

OTHER PUBLICATIONS

Jan. 24, 2017 Search Report issued in Great Britain Patent Application No. GB1614428.9.

* cited by examiner

DUAL WALLED COMPONENT FOR A GAS TURBINE ENGINE

TECHNICAL FIELD

The present invention relates to an air cooled dual walled component for a gas turbine engine.

BACKGROUND

Figure 1:
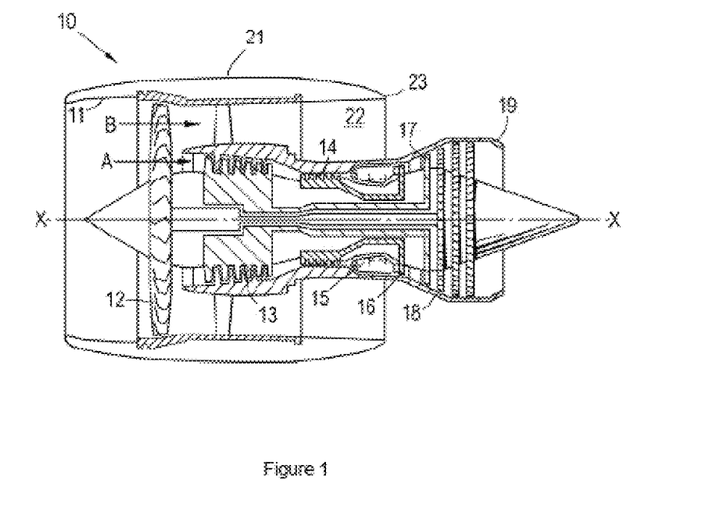
FIG. 1 shows a schematic longitudinal section of a gas turbine engine.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The performance of gas turbine engines, whether measured in terms of efficiency or specific output, is improved by increasing the turbine gas temperature. It is therefore desirable to operate the turbines at the highest possible temperatures. For any engine cycle compression ratio or bypass ratio, increasing the turbine entry gas temperature produces more specific thrust (e.g. engine thrust per unit of air mass flow). However as turbine entry temperatures increase, the life of an un-cooled turbine falls, necessitating the development of better materials and the introduction of internal air cooling.

In modern engines, the high-pressure turbine gas temperatures are hotter than the melting point of the material of the blades and vanes, necessitating internal air cooling of these airfoil components. During its passage through the engine, the mean temperature of the gas stream decreases as power is extracted. Therefore, the need to cool the static and rotary parts of the engine structure decreases as the gas moves from the high-pressure stage(s), through the intermediate-pressure and low-pressure stages, and towards the exit nozzle.

Figure 2:
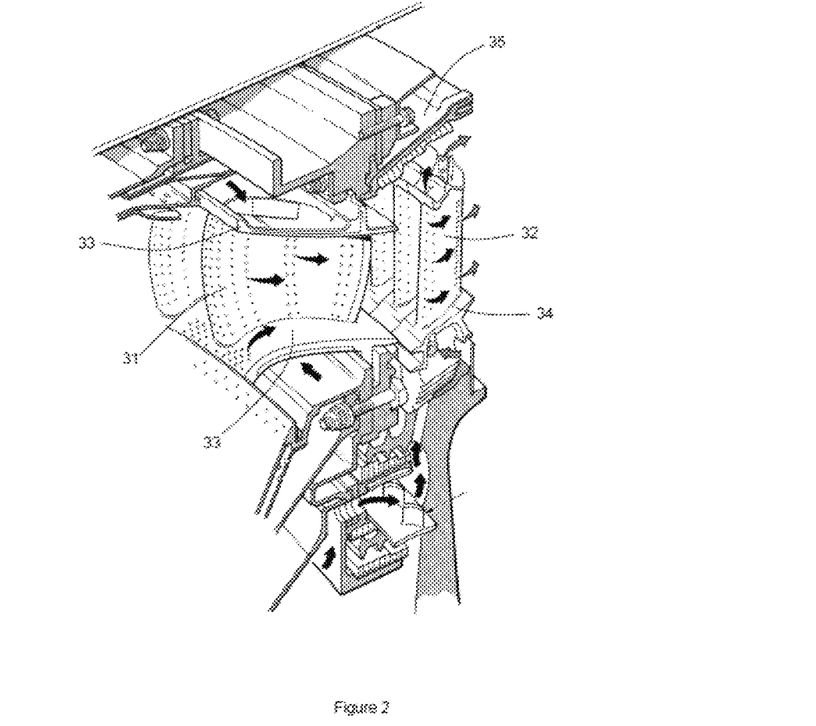
FIG. 2 shows a perspective view of circumferential section of a high pressure turbine stage.

FIG. 2 shows an isometric view of a typical single stage cooled turbine in which there is a nozzle guide vane in flow series with a turbine rotor. The nozzle guide vane includes an aerofoil 31 which extends radially between inner 32 and outer 33 platforms. The turbine rotor includes a blade mounted to the peripheral edge of a rotating disc. The blade includes an aerofoil 32 which extends radially outwards from an inner platform. The radially outer end of the blade includes a shroud which sits within a seal segment 35. The seal segment is a stator component and attached to the engine casing. The arrows in FIG. 2 indicate cooling flows.

Internal convection and external films are the prime methods of cooling the gas path components—airfoils, platforms, shrouds and shroud segments etc. High-pressure turbine nozzle guide vanes (NGVs) consume the greatest amount of cooling air on high temperature engines. High-pressure blades typically use about half of the NGV flow. The intermediate-pressure and low-pressure stages downstream of the HP turbine use progressively less cooling air. Cooling requirements often result in complex arrangements and geometries which are difficult to cast which require additional design and trial periods.

In addition to being able to withstand the elevated operational temperatures within the gas turbine, the turbine parts are also required to withstand the stress they are subjected to. The levels of stress will clearly vary according to the part it is generally true that increasing the stiffness of a component is conventionally achieved by increasing wall thickness or including strengthening elements such as webs or flanges. However, there is a direct correlation between increasing the thickness of a wall and the weight of a component which provides the component designer with a challenge to maintain the required stiffness in a component whilst reducing the weight as much as possible.

This invention seeks to provide an air cooled component which provides an increased stiffness for a given weight of material.

SUMMARY

The present invention provides a dual wall aerofoil and method for making the same according to the appended claims.

The present disclosure provides a dual wall aerofoil for a gas turbine engine, comprising: a first wall and a second wall having opposing inner surfaces to define a gap therebetween, the first wall being an external wall of the aerofoil, the second wall being an internal wall; a lattice of intersecting elongate ribs extending longitudinally along the first and second walls and between the inner surfaces of the first and second walls to provide a plurality of cells, wherein one or more portions of ribs include an aperture to provide a flow path between adjacent cells such that the cells are in fluid communication, wherein the lattice of elongate ribs are provided along intersecting imaginary longitudinal axes which are distributed across the inner surfaces and include a plurality of first longitudinal axes extending in a first direction, and a plurality of second longitudinal axes extending in a second direction wherein the plurality of first and second longitudinal axes are arranged at an angle to each so as to intersect to form a lattice and to define the plurality of cells.

Providing one or more portions with apertures within a lattice of intersecting ribs allows a cooling path to be formed between the two walls. The position and size of the apertures can be tailored to suit a particular flow regime between the walls, whilst the lattice or ribs provide strengthening features.

The adjacent axes within either or both of the first longitudinal axes and second longitudinal axes, or portions of the ribs associated with each axis, may be uniformly spaced from one another.

The ribs may be straight or curved.

The aperture may be one of a through-hole, a notch or a discontinuity of rib along the one of the axes.

The plurality of cells may be bounded by a plurality of ribs which join at intersections, the ribs having a common intersection are adjacent ribs and the ribs not having a common intersection are opposing ribs, further comprising a plurality of apertures located in adjacent ribs only or in opposing ribs only.

A hub may be located at an intersection of two or more ribs. The hub may have a transverse section in the plane of one or more of the walls which is either round or polygonal or x-shaped.

A pedestal may be located at an intersection of two or more axes.

One or more ribs may extend from the pedestal along an axis of the first longitudinal axes, or an axis of the second longitudinal axes.

The cells may extend between the inner surfaces of the first and second walls at an inclined angle relative to either or both of the inner surfaces.

The angle of the cell may be between 45 degrees and 75 degrees.

The angle may be between 45 degrees and 75 degrees to each other.

The apertures may be arranged in a sequence of opposing walls to provide a fluid path generally in line with the direction of a first group of ribs. The apertures may be arranged in a sequence of adjacent walls to provide a fluid path transverse to the longitudinal axes of a first and second group of ribs.

Either or both of an inlet aperture and an outlet aperture may be provided in either or both of the first or second walls.

The second wall may be aerofoil shaped.

One or more pedestals may be provided at the intersections of the first and second longitudinal axes.

The one or more apertures may provide a partial height rib which extends partially from either or both of the inner surfaces of the first or second wall wherein the partial height rib forms a turbulator.

The cells may have four sides.

The gap between the first wall and the second wall may be uniform.

The present disclosure also provides a method of creating the dual wall aerofoil. The method may comprise using an additive layer process in which layers of powder are sequentially laid down and selectively fused. The build direction of the component may result in the first and second walls being substantially vertical and the cells being inclined at an angle of between 45 degrees and 75 degrees to the plane of the powder layers.

The first and second walls may be separately cast and at least one of the walls may machined to provide the ribs and apertures.

Adjacent axes or straight sections of axes and ribs may be parallel to one another or angled relative to one another. The angling may provide a fan-like distribution of axes or ribs in which a first end of the axes or ribs is closer than a second end of axes or ribs. The ribs may be straight or curved.

The through-hole may be round in the form of a circular, oval or race track shaped hole. The aperture may be bounded by either or both of the inner surfaces of the first and second wall. The aperture may be bounded a portion of rib which extends partially from either or both of the inner surfaces of the first or second wall. The partial height rib may be in the form of a turbulator.

The hub may be circular in transverse section. The hub may be a quadrilateral in transverse section. The quadrilateral may be a parallelogram. The parallelogram may be a rhombus.

The angle may be between 55 and 65 degrees. In some examples, the angle of the cells may be 60 degrees. The ribs and walls may be perpendicular to the inner surface of the first or second walls. The ribs or axes may lie at an angle of between 45 degrees and 75 degrees to each other. The angle between adjacent ribs may be between 55 and 65 degrees. In some examples, the angle of the cells may be 60 degrees.

The apertures may be arranged in a sequence of opposing walls to provide a fluid path generally in line with the direction of a first group of ribs.

The apertures may be arranged in a sequence of adjacent walls to provide a fluid path generally transverse to the longitudinal axes of a first and second group of ribs.

Within the scope of this application it is expressly envisaged that the various aspects, embodiments, examples and alternatives, and in particular the individual features thereof, set out in the preceding paragraphs and in the following description and drawings, may be taken independently or in any combination. For example features described in connection with one embodiment are applicable to all embodiments, unless such features are incompatible.

DESCRIPTION OF DRAWINGS

Embodiments of the invention will now be described with the aid of the following drawings of which.

DETAILED DESCRIPTION

Unless stated to the contrary, in the following description, the length of the ribs is the dimension along the longitudinal axis, the height is the dimension of the rib which extends between the first and second walls and the width is the dimension transverse to the length when viewed in plan. It will be appreciated that opposing walls may be defined as walls which are separated by at least one further wall, the further wall being an adjacent or adjoining wall. Axial and radial directions are taken to be in relation to the principal axis of the engine. Upstream and downstream directions are to be taken in reference to the main gas path flow.

Figure 3:
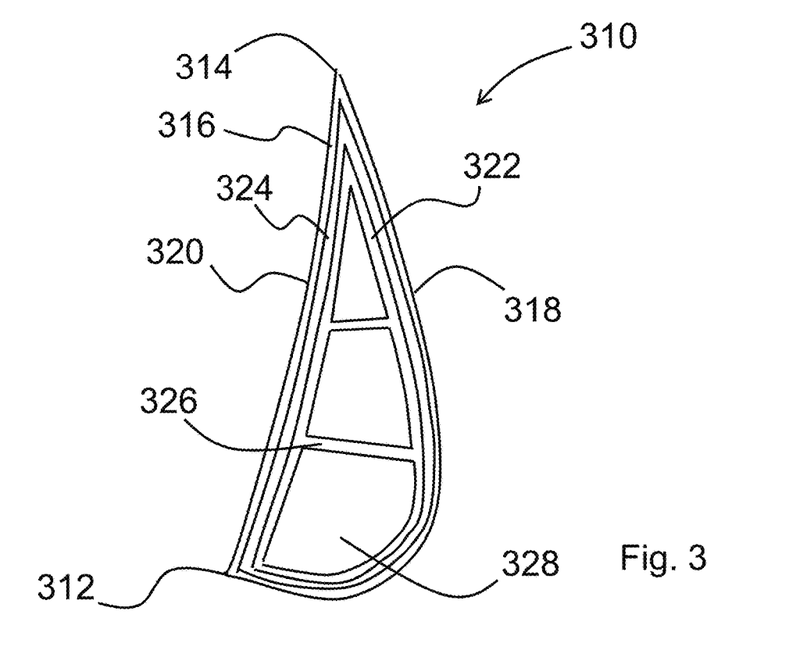
FIG. 3 shows a transverse section of an air cooled aerofoil.

FIG. 3 shows a transverse section (in relation to the radial) of an air cooled aerofoil 310 having leading 312 and trailing 314 edges with pressure 316 and suction 318 surfaces extending therebetween. The aerofoil has a dual wall construction in which there is provided a first 320 wall and a second wall 322 separated by a gap 324 therebetween. The first wall provides the outer, gas washed, surface of the aerofoil which resides within the main gas flow path in use. The second wall is an inner wall which is located within and enveloped by the first outer wall 320 of the aerofoil. The inner wall 324 comprises a pressure surface portion and a suction surface portion which are spanned by a plurality of webs 326 distributed along the axial length of the aerofoil 310. The inner wall 322 and webs 326 define radially extending flow passages 328 within the core of the aerofoil 310 for the distribution of cooling air as is well known in the art. The gap 324 between the inner 320 and outer 322 walls may be generally uniform across the extent of the of the component or may vary according as required.

The component may be any air cooled component. Within a gas turbine engine, such components may include an aerofoil or end wall of an aerofoil or a part of the combustor for example. The aerofoil may be that of a vane or blade similar to those shown in FIG. 2. The vane may be that of a nozzle guide vane. The blade may be a rotor blade.

Figure 4:
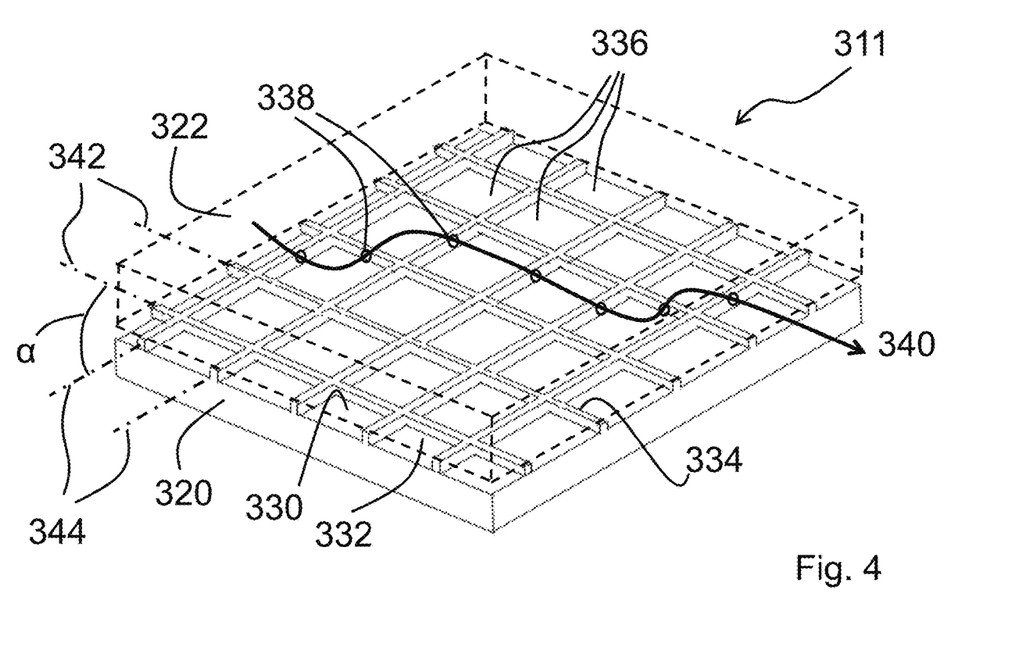
FIG. 4 shows a schematic arrangement of ribs and associated cells of an air cooled component.

FIG. 4 shows a perspective section of the aerofoil wall 311 which includes the first wall 320 and the second wall 322, the latter of which indicated by the dashed lines. The first 320 and second 322 walls include respective opposing inner wall surfaces 330 and 322 which define between them the aforementioned gap 324. The gap 324 between the inner wall surfaces 330, 332 is bridged by a plurality of projections in the form of elongate ribs 334 which define between them cells 336.

One or more of ribs 334 include an aperture 338 to provide a flow path between adjacent cells as indicated by the arrow 340 such that the cells are in fluid communication. The ribs 334 provide structural support between the first 320 and second 322 walls which allows the respective thickness of the walls to be reduced and the aerofoil mass reduced.

The ribs 334 can be thought of as being arranged on a lattice of intersecting imaginary longitudinal axes which are distributed across the inner surfaces 330 and 332 and define the plurality of cells 336. The longitudinal axes include a plurality of first longitudinal axes 342 extending in a first direction, and a plurality of second longitudinal axes 344 extending in a second direction.

Figure 5:
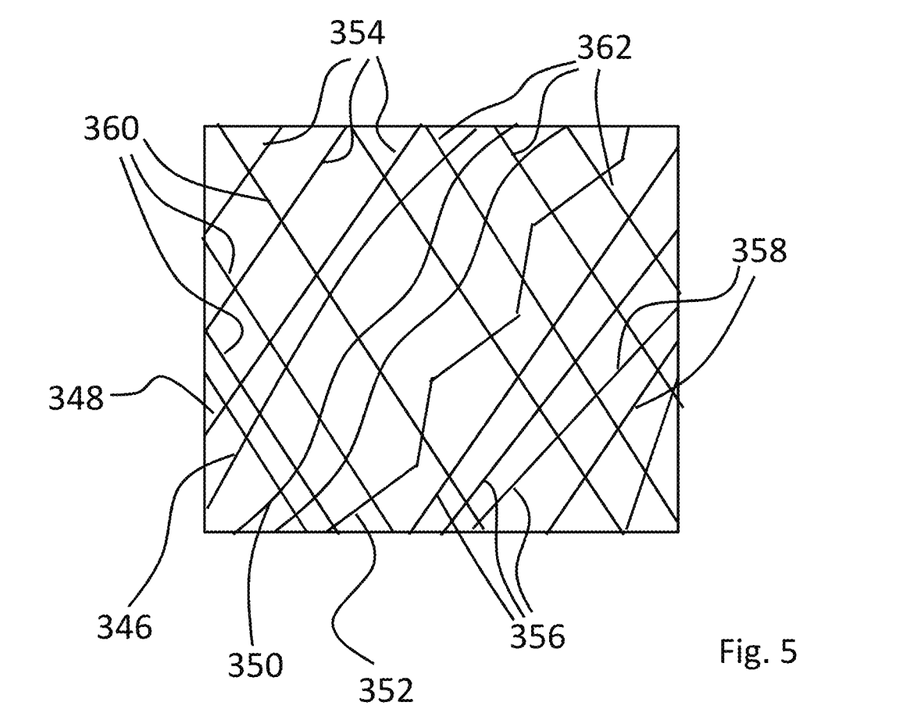
FIG. 5 shows various optional rib shapes in plan.

The plurality of first 342 and second 344 longitudinal axes are arranged at an angle α to each so as to intersect to define the plurality of cells. The shape and spacing of the axes 342, 344 and associated ribs 334 will determine the shape and size of the cells 336. In the depiction of shown in FIG. 4, α is 90 degrees and the axes are straight, equally spaced and parallel to each other (within their own respective set) such that the cells are square. However, as shown in FIG. 5, the first and second axes and associated ribs may differ in shape from one another as a set and within each set. The axes and ribs may be curved 346, straight 348, undulating 350, tortuous, wavy, saw tooth, castellated, zigzag 352 or any other shape or combination thereof. Thus, the distribution of longitudinal axes within each of the first and second groups of longitudinal axes may be uniformly spaced along their length or generally parallel 354 to one another. Alternatively, the axes and ribs may be angled relative to one another. The angling may provide a fanned distribution 356 in which the axes are closer together at a first end and further apart at a second end. The adjacent longitudinal axes may be divergent or convergent 358. The spacing of the axes may be even 362 or differ 360 throughout the distribution. It will be appreciated that FIG. 5 shows various possible alternatives which may but are unlikely to be used in the combination as shown. The exact distribution will be determined by the structural and load requirements of the component and portion of wall in question, together with the cooling required.

The shape of the cells may therefore be any shape. However, the cells will typically have four sides. The sides may be straight to provide a polygonal cell. The cell may be a quadrilateral. The quadrilateral may be a parallelogram and may be rectangular, square or rhomboidal.

The ribs 334 are arranged along the imaginary axes 342, 344 and extend between the inner surfaces of the first and second walls to partition and, in some cases, fluidically isolate the cells 336. However, one or more of the ribs may include an aperture 338 which fluidically connect adjacent cells.

Figures 6A, 6B, 6C:
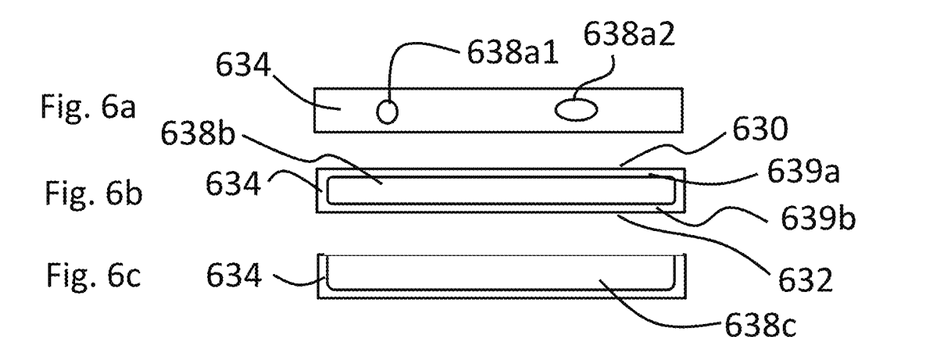
FIGS. 6a-d show examples of aperture shapes.
Figure 6D:
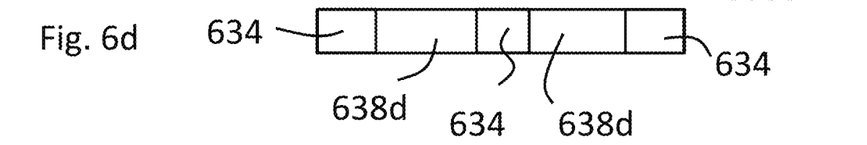

The apertures 338 may be provided by any opening in a section of rib 334 which defines a cell 336. FIGS. 6a to 6d provides some alternative types of aperture. FIG. 6a shows a rib 634 carrying round through-holes in the form of a circle 638a1 and an oval 638a2. FIG. 6b shows an elongate aperture 638b which is bounded above and below by strips of shallow rib 639a, 639b which attach to the inner wall surfaces 630, 632 respectively, of the first and second walls act as a turbulator in use. Turbulators are elongate projections which sit into the cooling air flow to disrupt the cooling air flow and increase the heat transfer from the wall as is well known in the art. FIG. 6c provides a notch 638c in the rib so that a portion of the rib is attached to only one of the other of the first or second wall with a vacancy extending from the shallow rib to the opposing inner wall surface 632. The remaining partial height rib provides a turbulator similar to the strips described in relation to FIG. 6b. Finally, FIG. 6d which shows a plurality of discontinuities 638d in the length of the rib 634 so as to provide apertures in the form of gaps in the rib. The gap or gaps may be the full height of the rib 634. It will be appreciated that each portion of rib may have single or multiple types of apertures as required by the stress and cooling requirements for the specific location on the component. Further, other types and shapes of aperture may be possible.

The apertures 338 provide a fluid pathway between adjacent cells 336. The fluid pathway may be link a plurality of cells 336 in fluid series as shown in FIG. 3, or provide a parallel flow arrangement in which fluid can flow through multiple cells in parallel flow paths. The apertures may be any size or shape and placed between any cells 336 as required by the flow and stress distribution of the component. The apertures may be placed anywhere along the length of the ribs but are typically located at a mid-portion of the ribs. Further examples are provided in FIGS. 9 and 10 below.

Figure 7A:
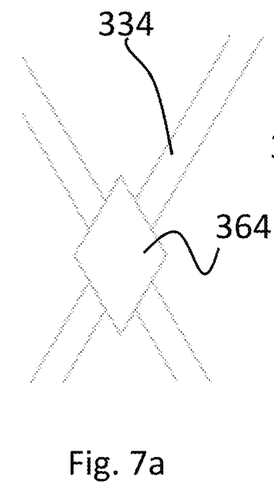
FIGS. 7a-c show examples of hub shapes.
Figures 7B, 7C:
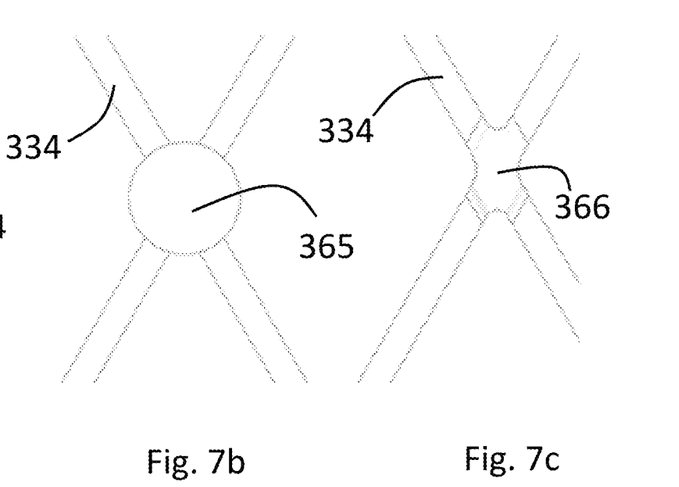

As shown in FIGS. 7a to 7c, the ribs 334 may terminate in a hub, at the intersection with adjacent ribs 334. The hub may be in the form of a pillar or pedestal to provide the union. A pedestal may extend from one of the inner surfaces of the wall to a free end short of the other of the inner surfaces. A pillar extends full span between the two inner surfaces. It will be appreciated that pedestals can extend from each of the first and second wall inner surfaces so as to oppose one another.

The hub may have any desirable section such as diamond 364 or circular 365. Alternatively, the hub 366 may be provided by a simple intersection of the ribs 334.

The angle between the longitudinal axis of the ribs may be any desired angle but will preferably be between 45 and 90 degrees. In some examples the ribs will preferably be separated by an angle of between 45 and 65 degrees. The ribs in FIG. 4 are at approximately 90 degrees with those in FIGS. 7a-c, 65 degrees.

Figure 8:
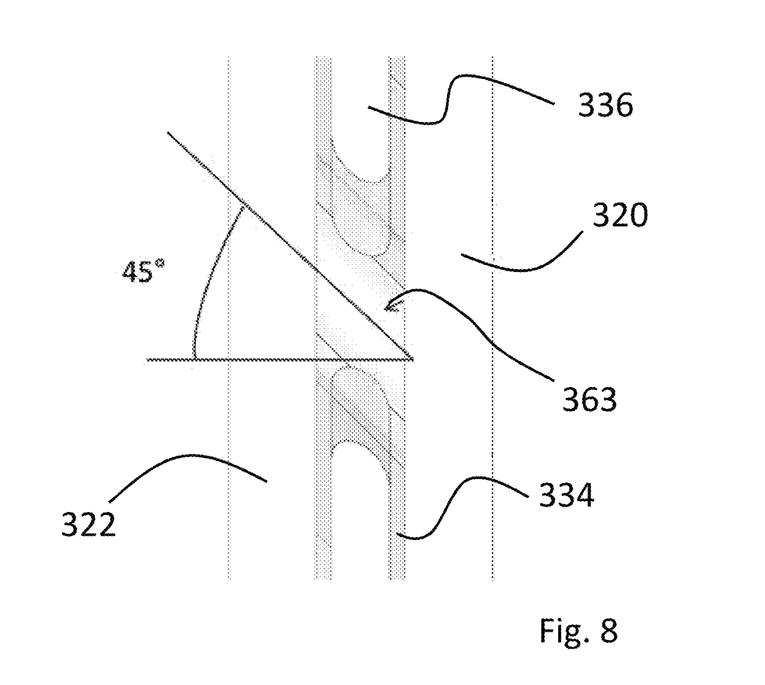
FIG. 8 shows a transverse section of a dual wall component in which the cells are inclined to the planes of the first and second walls.

The ribs and therefore cells may extend perpendicularly between the inner surfaces of the first 320 and second 322 walls as shown in FIG. 4. Alternatively, as shown in FIG. 8, the ribs 334 and hubs 363 may be angled relative to the inner surface of the first 320 and second 322 walls such that the cell 336 is inclined.

The angle of inclination of the cells 336 may be defined by an offset between the position of the rib 334 or axes lattice on one of the inner wall surfaces relative to the opposing inner wall surface. The angle of the cells 336 inclination will be determined by the offset and width of the gap between the inner walls. In the example of FIG. 8, the angle of inclination of the cells is 45 degrees but the angle may be between 40 and 75 degrees. In some examples the cells will be inclined to each other by an angle of between 55 and 65 degrees.

The inclination of the cells 336 is beneficial as it allows the construction of the dual walls structure and lattice of ribs to be more readily fabricated using an additive later process. For example, if the aerofoil were to be constructed bottom up as presented in the view of FIG. 8, then the angle allows upper layers to be at least partially supported by the underlying layers. If the ribs and pillars lay perpendicularly to the inner surface of the wall, then the first layers to go down would not be amply supported. It will be noted that the exact angle required will be depending on the build orientation of the component and also the type of apertures that are used, as it is the edges of the apertures which may need to supported rather than the length of the ribs or pillars. A preferable angle for the inclination of the cells 336 may be preferably 60 degrees. Similarly, the angle between the first and second distribution of ribs may preferably be 60 degrees.

Figure 9:
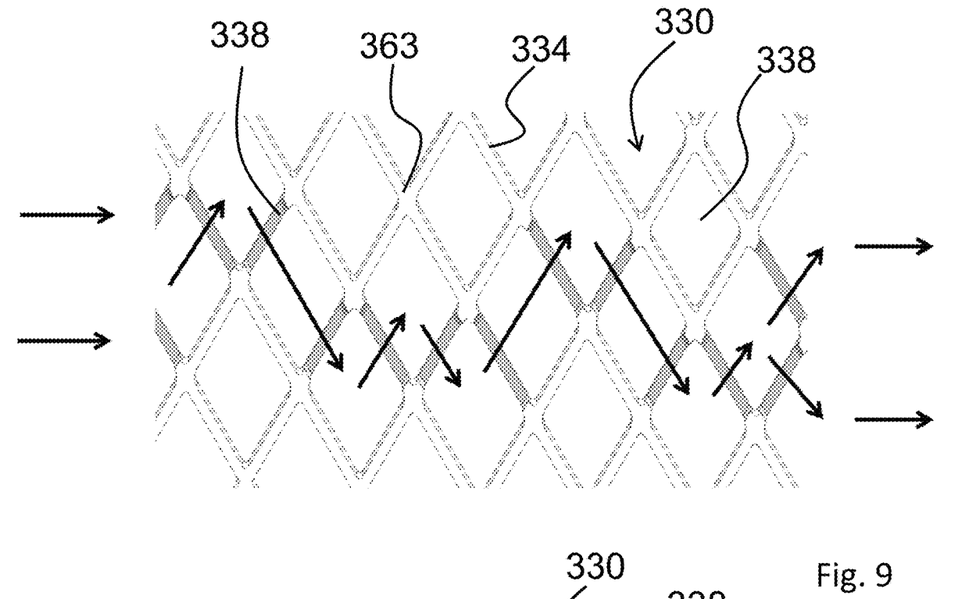
FIGS. 9 and 10 show different examples of cooling patterns.
Figure 10:
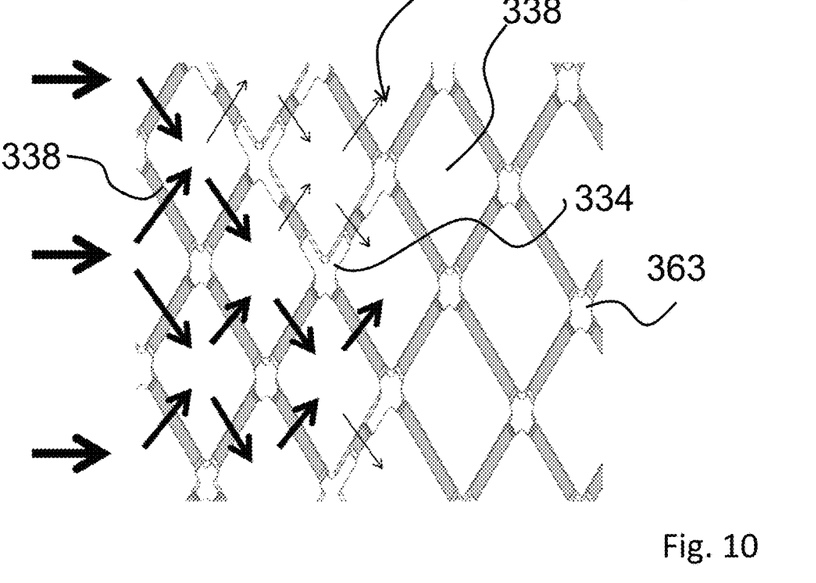

FIGS. 9 and 10 show examples of rib arrangements provided along the first and second axes having different configurations of apertures 338 to show how the flow path indicated by the arrows can be altered through the dual wall component. In both arrangements, there is provided a plurality of ribs 334 arranged along first and second imaginary axes which define cells 336. The plurality of first axes may be evenly distributed and parallel to one another. The plurality of second axes may also be evenly distributed and parallel to one another. The first and second axes intersect with one another at an angle of approximately 60 degrees to provide the lattice which defines the cells 336. Hence, the cells 336 are parallelograms in the form of a rhombi in which all the sides are equally sized.

The ribs 334 are provided along the axes and extend from the inner surface 330 of the wall and span the gap to the opposing inner surface.

The angle of inclination, or skew, of the cells in the direction perpendicular to the inner surface of the walls can be seen in FIGS. 9 and 10 which are plan views of the inner surface. Thus, the ribs 334 and hubs 363 extend out of the page and down so that the side walls of the ribs can be seen on the upper side thereof.

Various ones of the ribs 334 include apertures 338 in the form of discontinuities as shown in FIG. 6c. The discontinuities may extend partially between two adjacent hubs 363 so as to be a minority of the extent, or may be for all or the majority of the dimension between the two hubs 363, as required. In FIG. 9, the gaps in the ribs extend fully between adjacent hubs 363 and the same size in each instance. In FIG. 10, there is a distribution of sizes.

The portions of rib 334 which are removed from around a cell 336 may be determined according to a particular strengthening or flow pattern requirement. For example, apertures 338 may be in adjacent or adjoining ribs 334 of a cell 336 or in opposing walls of a cell 336, both of which are shown in FIG. 9. By selecting various aperture patterns, the flow path can be made to be aligned with the general direction of the axes, or traverse through the lattice. For example, the flow path may include apertures in two or more opposing walls in sequence to provide an aligned flow path, or sequentially in two or more adjacent walls to provide a traversing trajectory. Alternatively, the apertures may be provided in three or more of an individual cell's ribs 334 so as to provide a bifurcating flow path as shown to the right of FIG. 9.

As shown in FIG. 10, the ribs 334 may be removed on all sides of a plurality of adjacent hubs 363 to provide a distribution of pillars (or pedestals) extending between the inner surfaces of the inner and outer walls. These may be combined with a number of rib portions in an arrangement to provide a pillar arrangement with directed or metered flow. Hence, there may be an arrangement of pillars or pedestals in which some of the pedestals or pillars have ribs extending therefrom towards other hubs 363 to provide other forms of aperture. The apertures may be any of those described in connection with FIGS. 6a-d, such as those in which there is an absence of rib at the mid-portion of adjacent hubs. The apertures may be in the mid-portion between two hubs, or may be towards one or other of the hubs.

The flow access into the cells may be provided through a partitioning rib, or through an external aperture provided in one or both of the first and second walls of the dual wall component. The flow direction will provide the definition of the inlet and outlet apertures, but typically, the inner wall of the dual wall component may provide an inlet from the radially extending flow passages described in connection with FIG. 3, and the outlet will be in the externally facing wall to provide film cooling apertures or the like. However, the flow may be directed between flow passages within the inner wall of a component via the dual wall component, in which case the inlet and outlet apertures will both be in the inner wall. The apertures may be arranged in a single cell, or distributed amongst different cells.

Figure 11:
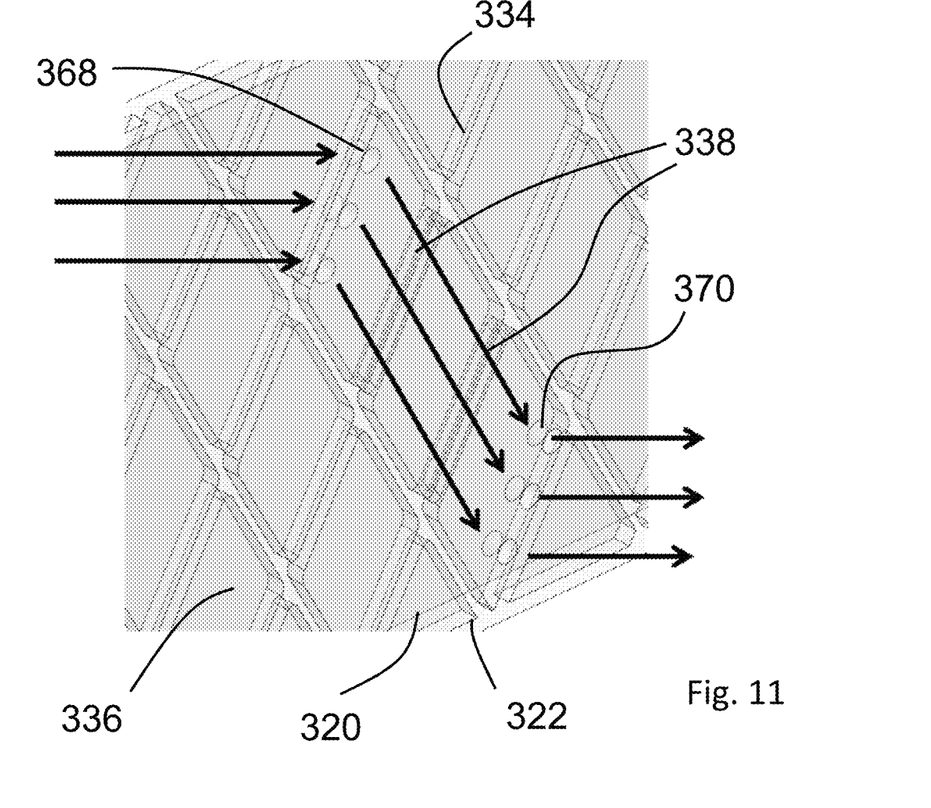
FIG. 11 shows an arrangement of a dual wall component having inlet and outlet apertures.

As can be seen in FIG. 11, the first wall includes a series of inlet apertures 368, and the second wall includes a series of outlet apertures 370 to provide a flow path through wall via one or more of the cells.

The formation of the dual wall component of the type described herein may be achieved using an additive layer process such as selective laser sintering or e-beam sintering in which layers of powders are progressively laid down on a bed and the areas of the component selectively sintered in each layer. Another method would be a so-called cast bond process in which the two walls are separately cast and machined prior to being bonded together as is well known in the art. Thus, the first wall may be cast prior to having the ribs machined therein and the other of the walls being cast and bonded to the first wall thereafter.

It will be appreciated from above description of the additive layer fabrication technique that the term removal of a portion or portions of a rib to provide an aperture does not require a rib to be provided and subsequently machined or removed. Further, additional apertures may be provided in the inner and outer walls to allow the extraction of powder from the cells after fabrication. These powder holes may provide an in use outlet or inlet or may be sealed prior to using with an appropriate technique such as welding.

It will be understood that the invention is not limited to the described examples and embodiments and various modifications and improvements can be made within the invention as defined by the appended claims. Except where mutually exclusive, any of the features may be employed separately or in combination with any other features in the disclosure extends to and includes all combinations and sub-combinations of one or more described features.

The invention claimed is:

1. A dual wall aerofoil for a gas turbine engine, the dual wall aerofoil comprising:
   a first wall and a second wall having opposing inner surfaces defining a gap therebetween, the first wall being an external wall of the dual wall aerofoil, the second wall being an internal wall of the aerofoil; and
   a lattice of an intersecting plurality of elongate ribs, each elongate rib of the plurality of elongate ribs extending longitudinally along a plane and along the first and second walls, each elongate rib of the plurality of elongate ribs extending linearly and entirely across the gap between the inner surface of the first wall and the inner surface of the second wall at acute angles with respect to the inner surface of the first wall along a longitudinal length of the plurality of elongate ribs so as to provide a plurality of inclined cells, one or more portions of the plurality of elongate ribs including an aperture providing a flow path between adjacent cells of the plurality of inclined cells such that the adjacent cells are in fluid communication,
   wherein the lattice of the intersecting plurality of elongate ribs are provided along intersecting longitudinal axes distributed across the inner surfaces, the intersecting longitudinal axes including:
     a plurality of first longitudinal axes extending in a first direction, and
     a plurality of second longitudinal axes extending in a second direction at an angle with respect to the first direction so as to intersect and form the lattice defining the plurality of inclined cells.

2. The dual wall aerofoil as claimed in claim 1, wherein the adjacent first longitudinal axes or the adjacent second longitudinal axes are uniformly spaced from one another.

3. The dual wall aerofoil as claimed in claim 1, wherein the aperture is one of a through-hole, a notch, or a discontinuity of rib along the one of the first longitudinal and second longitudinal axes.

4. The dual wall aerofoil as claimed in claim 1, further comprising:
   a plurality of apertures located either in adjacent ribs only or in opposing ribs only,
   wherein the plurality of cells are bounded by the plurality of elongate ribs, which join at a plurality of intersections, ribs of the plurality of elongate ribs with a common intersection being the adjacent ribs and ribs of the plurality of elongate ribs not with a common intersection being the opposing ribs.

5. The dual wall aerofoil as claimed in claim 1, further comprising a hub located at an intersection of two or more ribs of the plurality of elongate ribs, the hub having a transverse section in a plane of one or more of the first and second walls, the hub having a shape that is one of round, polygonal, or x-shaped.

6. The dual wall aerofoil as claimed in claim 1, further comprising a pedestal disposed at an intersection of two or more axes of the first longitudinal and second longitudinal axes.

7. The dual wall aerofoil as claimed in claim 6, wherein one or more ribs of the plurality of elongate ribs extend from the pedestal along either one of (i) an axis of the first longitudinal axes, or (ii) an axis of the second longitudinal axes.

8. The dual wall aerofoil as claimed in claim 1, wherein the acute angle of the plurality of elongate ribs extending longitudinally along the first and second walls and extending straight across the gap between the inner surface of the first wall and the inner surface second wall is between 45 degrees and 75 degrees.

9. The dual wall aerofoil as claimed in claim 1, wherein the angle between the first longitudinal axis and the second longitudinal axis is between 45 degrees and 75 degrees.

10. The dual wall aerofoil as claimed in claim 1, wherein:
    the plurality of cells are bounded by the plurality of elongate ribs joining at a plurality of intersections, the plurality of elongate ribs having a common intersection being adjacent ribs and the ribs not having a common intersection being opposing ribs, and
    a plurality of apertures are arranged in a sequence of opposing walls providing a fluid path in line with a direction of a first group of ribs of the plurality of elongate ribs.

11. The dual wall aerofoil as claimed in claim 1, wherein:
    the plurality of cells are bounded by the plurality of elongate ribs joining at intersections, the plurality of elongate ribs having a common intersection being adjacent ribs and the ribs not having a common intersection being opposing ribs, and
    a plurality of apertures are arranged in a sequence of adjacent walls providing a fluid path transverse to the longitudinal axes of a first group of ribs and a second group of ribs.

12. The dual wall aerofoil as claimed in claim 1, in which either or both of an inlet aperture and an outlet aperture is provided in either or both of the first or second walls.

13. The dual wall aerofoil as claimed in claim 1, wherein the second wall is aerofoil-shaped.

14. The dual wall aerofoil as claimed in claim 1, further comprising one or more pedestals disposed at the plurality of intersections of the first longitudinal axes and the second longitudinal axes.

15. The dual wall aerofoil as claimed in claim 1, wherein one or more apertures of a plurality of apertures provide a partial height rib extending partially from either or both of the inner surfaces of the first wall or second wall, the partial height rib forming a turbulator.

16. The dual wall aerofoil as claimed in claim 1, wherein each cell of the plurality of cells has four sides.

17. The dual wall aerofoil as claimed in claim 1, wherein the gap between the first wall and the second wall is uniform.

18. A method of creating the dual wall aerofoil as claimed in claim 1, wherein:
    the first wall and the second wall are separately cast, and
    at least one of the first wall and second wall is machined to form the ribs and apertures.

* * * * *